Patented Jan. 20, 1931

1,789,884

UNITED STATES PATENT OFFICE

KARL SCHIRMACHER AND KONRAD RENN, OF HOCHST-ON-THE-MAIN, GERMANY, ASSIGNORS TO GENERAL ANILINE WORKS, INC., OF NEW YORK, N. Y., A CORPORATION OF DELAWARE

ACID AMIDES OF 7-AMINO-1.4-NAPHTHOQUINONE AND PROCESS OF PREPARING THEM

No Drawing. Application filed May 22, 1928, Serial No. 279,845, and in Germany May 28, 1927.

Our present invention relates to acid amides of 7-amino-1.4-naphthoquinone and to a process of preparing them, more particularly to compounds of the following constitution:

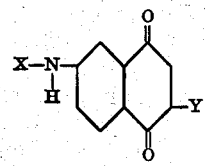

wherein X stands for acyl, aroyl, or arylsulfonyl and Y for hydrogen or a sulfo group.

We have found that new, hitherto unknown, derivatives of 1.4-naphthoquinone are obtained by subjecting to oxidation 7-acylamino-1-hydroxynapththalene or substitution products thereof. Care should be taken that the reaction is conducted at a low temperature, advantageously at 0° C. or below. Thus acylamino-1.4-naphthoquinones are formed with a good yield. This is a surprising reaction since by the action of oxidizing agents upon α-naphthol itself there are obtained only traces of naphthoquinone (cf. "Berichte der deutschen Chemischen Gesellschaft" volume 14, page 1602). The new compounds obtainable according to this invention are valuable intermediate products for the manufacture of dyestuffs.

The following examples illustrate our invention, but they are not intended to limit it thereto; the parts are by weight:

(1) 10 parts of finely-powdered 7-acetamino-1-naphthol are introduced at −10° C. to 0° C. into a solution of 30 parts of chromic anhydride and 180 parts of acetic acid of 50 per cent strength. The mixture is then further stirred at the said temperature for about 2 hours, 180 parts of water are added and, after having stirred the whole for three hours, the product of the reaction is filtered off by suction at about 0° C. The dried yellowish-brown crude product is extracted by means of boiling chloroform or xylene. The chloroform is distilled off or the xylene allowed to cool, whereupon the 7-acetamino-1.4-naphthoquinone of the following formula:

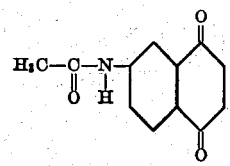

is obtained as an intensely yellow crystalline powder. At a temperature upwards of about 205° C. it begins to assume quickly a black coloration and, when being slowly heated, decomposes at 228° C. to 230° C. without previously showing an exact melting point. The compound dissolves in hydrosulfite and dilute alkali or ammonia to faintly colored solutions of the corresponding hydroquinone.

(2) 13.2 parts of finely-powdered 7-benzoylamino-1-naphthol are introduced, while stirring, and at a temperature of −10° C. to 0° C. into a solution of 30 parts of chromic anhydride and 180 parts of acetic acid of 50 per cent strength. The mixture is further stirred at the said temperature for two hours whereupon there are added 180 parts of water and after three hours the reaction product is filtered by suction. The pure 7-benzoylamino-1.4-naphthoquinone of the formula:

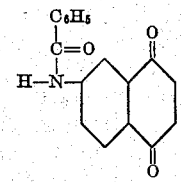

is obtained from the crude product in the manner indicated in the preceding example or by recrystallizing it from commercial 1.2.4-trichlorobenzene. It is a yellow crystalline powder which at about 200° C. begins to sinter and to assume a dark coloration; it decomposes at a temperature upwards of 232° C. without having a sharp melting point. It shows the same behaviour towards hydrosulfite as the acetyl compound.

(3) 60 parts of chromic anhydride are introduced into 360 parts of acetic acid of 50 per cent strength and there are then added to this mixture at −5° C. to 0° C. by small portions and while stirring 32 parts of 7-N-para-toluenesulfonylamino-1-hydroxynaphthalene. After having stirred the mass for another hour 360 parts of water are added thereto and after an hour the reaction product is filtered by suction. The dried crude quinone is purified by first crystallizing it from xylene or trichlorobenzene and subsequently crystallizing it from glacial acetic acid. It is an orange-colored crystalline powder which when slowly heated assumes a dark coloration at a temperature upwards of about 200° C.; it sinters from about 215° C., melts but not sharply at 230° C. to 235° C. and decomposes at about 245° C. to 250° C. The compound has the following constitution:

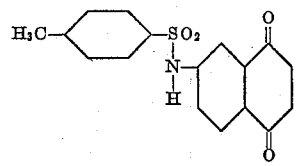

It shows the same behaviour towards hydrosulfite as the acetyl compound.

(4) 92 parts of the sodium salt of 7-benzoylamino-1-hydroxynaphthalene-3-sulfonic acid are gradually introduced at 0° C., while stirring, into a solution of 150 parts of chromic anhydride in 900 parts of acetic acid of 50 per cent strength. The mixture is stirred for another hour at 0° C., 450 parts of water are added thereto and the sodium salt of the 7-benzoylamino-1.4-naphthoquinone-3-sulfonic acid of the formula:

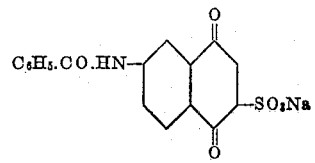

is salted out from the solution by the addition of 250 parts of sodium chloride. After several hours' stirring the product is filtered by suction and washed with a saturated solution of sodium chloride.

The product is recrystallized from boiling water in order to eliminate therefrom any small quantities of black impurities. On cooling there is obtained from the filtrate the sodium salt in the form of orange-red brilliant crystals or of a brownish-yellow crystalline powder. It shows the same behaviour to hydrosulfite as the acetyl compound.

In the following claims the term "acid amides" is intended to comprise both carboxylic acid amides and sulfonic acid amides.

We claim:

1. The process of preparing acid amides of 7-amino-1.4-naphthoquinone which consists in treating an acid amide of 7-amino-1-hydroxynaphthalene in an acetic acid solution with chromic anhydride while cooling.

2. The process of preparing acid amides of 7-amino-1.4-naphthoquinone which consists in treating a compound of the following general formula:

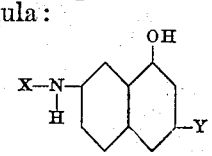

wherein X stands for acyl, aroyl or arylsulfonyl and Y for hydrogen or a sulfo group, with chromic anhydride while cooling.

3. The process of preparing acid amides of 7-amino-1.4-naphthoquinone which consists in treating a compound of the following general formula:

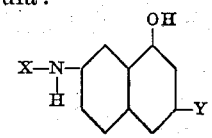

wherein X stands for acyl, aroyl or arylsulfonyl and Y for hydrogen or a sulfo group, with chromic anhydried at a temperature between −10° C. and +10° C.

4. The process of preparing acid amides of 7-amino-1.4-naphthoquinone which consists in treating a compound of the following formula:

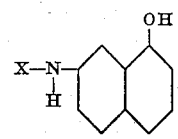

wherein X stands for acyl, aroyl or arylsulfonyl with chromic anhydride at a temperature between −10° C. and +10° C.

5. The process of preparing acid amides of 7-amino-1.4-naphthoquinone which consists in treating a compound of the following formula:

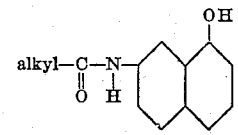

with chromic anhydride at a temperature between −10° C. and +10° C.

6. The process of preparing an acid amide of 7-amino-1.4-naphthoquinone which consists in treating the compound of the following formula:

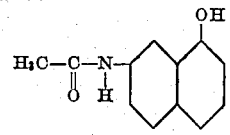

with chromic anhydride at 0° C.

7. As new products, the compounds of the following constitution:

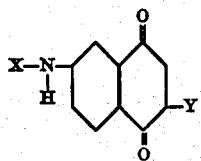

wherein X stands for acyl, aroyl or arylsulfonyl and Y for hydrogen or a sulfo group, being yellow to brown crystalline powders dissolving in hydrosulfite and dilute alkali or ammonia to feebly colored solutions.

8. As new products, the compounds of the following constitution:

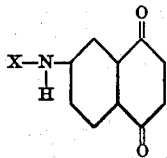

wherein X stands for acyl, aroyl or arylsulfonyl, being yellow to brown crystalline powders dissolving in hydrosulfite and dilute alkali or ammonia to feebly colored solutions.

9. As new products, the compounds of the following constitution:

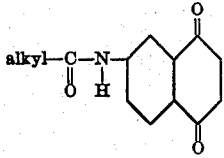

being yellow to brown crystalline powders dissolving in hydrosulfite and dilute alkali or ammonia to feebly colored solutions.

10. As a new product, the compound of the following constitution:

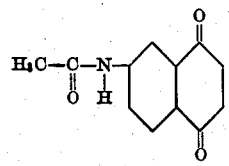

being a yellow crystalline powder dissolving in hydrosulfite and dilute alkali or ammonia to a feebly colored solution.

In testimony whereof, we affix our signatures.

KARL SCHIRMACHER.
KONRAD RENN.